United States Patent Office 3,505,263
Patented Apr. 7, 1970

3,505,263
RESIN BONDED SEMICONDUCTING COMPOSITIONS OF CALCINED PETROLEUM COKE
Harold H. Roth, Bay City, Mich., assignor to The Dow Chemical Company, Midland, Mich., a corporation of Delaware
No Drawing. Filed Apr. 8, 1965, Ser. No. 446,699
Int. Cl. C08f 45/08; C08d 7/02; H01b 1/04
U.S. Cl. 260—29.6
19 Claims

ABSTRACT OF THE DISCLOSURE

This application discloses and claims a composition for forming electrically conductive coatings on non-conducting surfaces, said composition comprising finely divided calcined petroleum coke and a polymer latex binder. The application also discloses and claims a method for coating such surfaces and the coated articles resulting therefrom.

---

Electrically conductive coatings which function to produce heat as electrical current passes through them are now well known in the art. Such coatings ordinarily comprise a conductive material distributed throughout a non-conductive binder which attaches the coating to a supporting base. The two most common conductive materials are carbon black and graphite, with graphite being the most popular. The electrical conductance is varied by controlling the proportion of carbon in the coating, but it has also been suggested to combine carbon with a metal to accomplish this purpose. Metals most commonly used in these coatings are silver, copper, and iron, usually in granular or flake form.

One of the important requirements of electrically resistive coatings is that they maintain a steady and uniform electrical conductance as the temperature changes during use. One of the disadvantages which results from using a coating containing carbon and a flaky metal such as silver flakes is that temperature changes in the coating tend to disrupt the orientation of the flakes in the coating, and this is thought to be due to the wide differences in the rates of thermal expansion of the carbon, the flakes of metal and the binder. In such coatings, the stresses developed during repeated heating and cooling of the film ultimately results in cleavage or separation between the flaky particles and the resin binder with consequent alteration in the electrical conductance and heat-producing ability of the coating.

Another problem encountered with graphite containing coatings, as well as with carbon black, is their lack of resistance to cracking and tearing when slightly above normal stress is applied to the base material. In addition, the electrically resistive coatings containing graphite or carbon black have proven to be less efficient in operation than is required of an economical and competitive heating material. This is due in part to the binders in use for this purpose, some examples of which are plasticized vinyl acetate, polyolefins, phenol-formaldehyde resins, ureaformaldehyde resins, acrylic ester polymers, and silicone-alkyd copolymers.

To overcome these and other disadvantages, it is an object of this invention to provide a composition which can be applied to a surface to form an electrically conductive heat-producing coating having improved thermal, electrical and mechanical stability during prolonged periods of use, as well as a method for making the same and to provide improved heating panels, particularly suitable for home heating and the like.

In accordance with this invention, it has been found that the above stated disadvantages of the prior art are overcome, and the above and related objectives fully realized by the formulation and use of a composition comprising a heat-stable, flexible resin latex binder and a finely divided carbon, such as calcined petroleum coke.

It has been found that the use of petroleum coke is superior to the use of carbon black and graphite, and produces coatings having improved tensile strength, uniformity in electrical conductance and heat-generating characteristics over long periods of use. Petroleum coke has been found to be more easily dispersible in the heating compositions of the present invention, generally providing a composition much easier to apply than equivalent coatings using graphite or carbon black. Equivalent composition coatings using graphite and carbon tend to be much more difficult to work with and fail to provide an easily applied coating, as compared to the coke coatings of the present invention.

The calcined petroleum coke useful in the present invention is preferably 94 percent screened through a 100 mesh screen (Tyler equivalent). The concentration of coke, on a dry basis, in the present invention is from about 95 percent to about 50 percent, and preferably should be about 90 percent. Calcined petroleum coke, its properties and manufacture, is well known and available commercially from many sources. It is described in great detail in: (1) Thomas, C. L., "Petroleum Coke and Coking." Advances in Chemical Series (1951) No. 5; and (2) Weber, G., "Petroleum Coke." Oil and Gas Journal, (Mar. 22, 1954) 52, No. 46, pp. 151–154; and in many other such sources. A relatively new process for manufacturing petroleum coke is reported in: Mekler, V. et al., "The Lummus Continuous Contact Coking Process." "Petroleum Refiner" (December 1953) 32, No. 12, p. 131.

Typical calcined petroleum coke properties are found in Table I.

TABLE I

Properties.—Calcined petroleum coke

| Content: | Amount |
|---|---|
| Volatile matter, (maximum) percent | 0.5 |
| Ash, percent | 0.5 |
| Iron, percent | 0.03 |
| Silicon, percent | 0.05 |
| Sulfur, percent | 1.0–2.0 |
| Moisture, (maximum) percent | 0.5 |
| Real density, (gram/centimeter$^3$) | 2.01–2.07 |

The latex binder for the conducting particles serves to maintain the particles in fixed relationship to each other in the electrically resistive coating and to adhere the coating to the base. The binder must be one which resists deterioration from oxidation, moisture and the like at room and operating temperature, and must maintain good adherence to the non-conducting base and to the carbon particles as thermal expansion forces are exerted during normal and rapid changes in temperature. The binder should not deteriorate nor detrimentally affect the electrical resistance of the coating at room temperature up to normal operation temperatures and slightly above.

A number of latex binders are satisfactory for this purpose, and particularly satisfactory results have been obtained with a copolymer of styrene-butadiene with acrylic acid and fumaric acid. Other useful latex compositions include vinylidene chloride-acrylonitrile copolymer, polyvinyl acetate, and ethyl acrylate-methyl methacrylate copolymer with methacrylic acid and acrylic acid.

The amount of latex useful for the present invention is from about 5 percent to about 50 percent, and preferably about 10 percent, calculated on a dry basis. The latex is preferably water dispersible and should provide an adherent, tack-free coating when compounded with the other ingredients of the present invention.

Enough water is added to the composition to provide dispersibility to the latex and the petroleum coke. The preferred amount of water in the finished composition is from about 35 to about 22 percent, depending on whether a brushable or sprayable composition is desired. For spraying, a higher amount of water is preferable, while a lower amount of water can be used for brushable coatings.

To aid in dispersing the coke in the composition of the present invention, it is useful to use a dispersant such as the sodium salt of a carboxylated polyelectrolyte (Tamol 731 Dispersant—Rohm & Haas). The amount used is from about 0.01 to about 1.0 percent, and preferably about 0.1 percent. Other additives are also useful, such as methylcellulose (Methocel 90 HG–DGS, 50,000 centipoises—Dow Chemical Co.). The preferred amount is from about 0.01 to about 1.0 percent, preferably about 0.02 percent. Methylcellulose aids the present composition in improving thickness and spreadability. It is not critical in the compositions of the present inventon and can be omitted without affecting the performance of the heat-producing coating composition.

The method of this invention comprises the steps of formulating a coating composition and applying it to the surface of the base by any of several known methods of applying latex to surfaces. This can be done by brushing, spraying, spreading, and the like. After application of the coating composition to the base, the composition is cured at room or slightly elevated temperature, depending on the particular latex employed in the composition. As is normal with most latex compositions, curing is done at room temperature, and experience has shown this to be the best method. Indeed, one of the advantages of the present invention is that it can be applied to a base without the use of special equipment and without having to effect a cure at elevated temperatures.

The compositions of this invention can be applied to any electrically non-conducting surface which is thermally suitable, such as glass, paper, cloth, wood, asbestos, glass-reinforced plastics, dry-wall siding, plastic foam and the like. It is essential that the coatings be applied only to electrically non-conductive surfaces. They can be applied so as to face the room-side of the material, or they may be applied to the reverse-side of, and radiate through, the material. If the former method of application is used, it may be desirable to cover the coating composition with a protective and decorative coating of some sort, such as a heat stable paint or latex.

The present invention is particularly suitable for application on the exposed side of a wall or panel because of the improved tensile strength and impact resistance over somewhat similar compositions using graphite and carbon black. However, in some applications it may be desirable to apply the present coating compositions to the reverse side of a wall or panel. In such case, there is little loss of efficiency if care is taken to use non-insulative wall or panel members. It may also be desirable in such instances to cover the heating composition with an insulative material to insure maximum heating efficiency through the panel or wall member into the area being heated.

Relatively thin coatings are effective in heating large areas. Heat output is not a function of thickness of the coating, but is rather a controlling factor in spacing electrodes supplying electricity to the coated panel or wall member. The thickness of the coating is preferably between about 0.005 and about 0.2 inch. The thickness in any particular application being dependent on spacing of electrodes, as stated above. Also, the thicker the coating the lower are the voltage requirements necessary to operate the heating panel at maximum efficiency. The operating voltage requirements are from about 5 to about 240 volts, with the preferred requirement being from about 40 to about 120 volts, A.C. (60 cycles).

The following examples are intended to illustrate typically suitable compositions and the effect of variations in the relative proportions of the conductive coatings, but it is to be understood that the examples do not represent the defining limits of the invention which have been set forth herein above and are included in the appended claims.

EXAMPLE 1

A coating composition was prepared containing:

| | Parts by weight |
|---|---|
| Calcined petroleum coke | 100 |
| Sodium salt of a carboxylated polyelectrolyte (1 percent Tamol 731—Rohm & Haas) | 10 |
| Water | 25 |
| Styrene-butadiene-acrylic acid-fumaric acid, 48% solids | 55 |

The composition was prepared by adding the Tamol 731 (1 percent solution in water) and water to the coke and mixing well. When the coke was wetted well, the styrene-butadiene copolymer was added and mixed until a uniform mixture was obtained, resulting in a thin slurry. The mixture was brushed evenly over a plate glass surface and then dried for about 2 hours. A second coat was applied and allowed to dry. Measurement showed the film thickness to average about 0.02 inch and the coated panel when subjected to the passage of electrical current, at 110 volts, showed the coating to have an electrical resistance of 8.5 ohms per square. The coating was peeled from the glass plate, strips cut from the coating, and tested for maximum breaking load and percent elongation. Results in Table II.

For comparison, similar formulations were prepared using graphite in place of the coke, and a polyvinyl acetate copolymer (Flexbond 800, 52 percent solids—Colton Chemical Co.) in place of the styrene-butadiene copolymer. Equivalent amounts of the ingredients were used throughout and the same procedure for mixing was observed. Results of testing are found in Table II.

TABLE II

| Ex. | Semiconductor | Latex (percent) | Thickness (inch) | Maximum Breaking Load [1] (lbs.) | Elongation (percent) |
|---|---|---|---|---|---|
| 1 | Calcined petroleum coke. | Styrene-butadiene latex (21 percent). | 0.020 | 2.15 | 13.5 |
| 2 | Graphite | do | 0.020 | 0.83 | 8.7 |
| 3 | Calcined petroleum coke. | Polyvinyl acetate latex (27 percent). | 0.022 | 5.38 | 13.9 |
| 4 | Graphite | do | 0.027 | 1.79 | 6.4 |

[1] Crosshead speed of 0.2 inch/minute and gage length of 1 inch.

Carbon-latex compositions were prepared to test specific resistivity of various coatings. As a comparison, graphite (Example 5) and calcined petroleum coke (Example 6) plugs were prepared.

The carbons were screened through a 100 mesh screen and collected on top of a 200 mesh screen. The screened carbons were poured, in small amounts, into the ½ inch D cavity in the cylinder of a brass conductivity cell. The carbons were compressed between increment additions by tamping the ½ inch D brass ram until the carbon plug reached a height of 1⅛ inches. The resistance of the carbon plugs was measured with an RCA Volt-Ohmyst, Model WV–77E. Results in Table III, as Examples 5 and 6.

Molded compositions were prepared according to the following method. To 100 grams of the carbon was added 10 ml. of 1 percent dispersant in water plus the required amount of the latex as a 50 percent solids dispersion in water. The mixtures were thoroughly stirred, then spread on a glass plate to dry. When dry, the compositions were compounded on steam heated rolls at about 165° C., then compression molded at about 180° C. The molded bars were measured for electrical resistivity by clamping between polished aluminum plates. These molded compositions are represented in Table III, as Examples 7–10.

Cast compositions were prepared according to the procedure in Example 1. In comparing electrical resistivity, Examples 11 through 14 are Examples 1 through 4, respectively. Results in Table III, as Examples 11–14.

TABLE III

| Example | Conductive Material | Specific Resistivity (ohm-cm.) |
|---|---|---|
| 5 | Calcined petroleum coke powder | 0.27 |
| 6 | Graphite powder | 0.058 |
| | Cast compositions: | |
| 7 | Calcined petroleum coke, 33% vinylidene chloride-acrylonitrile copolymer with dibutyl phthalate. | 2.5 |
| 8 | Graphite, 33% vinylidene chloride-acrylonitrile copolymer with dibutyl phthalate. | 30.0 |
| 9 | Calcined petroleum coke, 45% vinylidene chloride-acrylonitrile copolymer with dibutyl phthalate. | 15.6 |
| 10 | Graphite, 45% vinylidene chloride-acrylonitrile copolymer with dibutyl phthalate. | 73.3 |
| | Molded compositions: | |
| 11 | Calcined petroleum coke, 21% styrene-butadiene latex. | 0.42 |
| 12 | Graphite, 21% styrene-butadiene latex. | 0.70 |
| 13 | Calcined petroleum coke, 27% polyvinyl acetate latex. | 1.18 |
| 14 | Graphite, 27% polyvinyl acetate latex. | 1.73 |

It can be readily seen from the above table that the latex coating compositions containing calcined petroleum coke have a higher electrical conductance than comparable compositions prepared with graphite, although graphite is much more conductive than coke in the dry, compressed powder form.

This fact, along with the extra strength and durability of the compositions of the present invention, make the coke-latex coating compositions truly unique. The higher electrical conductance of the present compositions allow a product with improved efficiency and economy over known, related products.

I claim:

1. A composition for forming an electrically conductive coating on a non-conducting surface which comprises a mixture of about 5 to about 50 percent by weight of a heat-stable latex selected from the group consisting of a copolymer of styrene and butadiene, a copolymer of vinylidene chloride and acrylonitrile with dibutyl phthalate, a copolymer of ethyl acrylate and methyl methacrylate, and polyvinyl acetate, and from about 95 to about 50 percent by weight of a finely divided calcined petroleum coke, and water and a dispersant.

2. A composition in accordance with claim 1, wherein said latex is a copolymer of styrene and butadiene, with fumaric acid and acrylic acid in water.

3. A composition in accordance with claim 2, wherein said latex comprises about 57 percent styrene and about 41 percent butadiene, with about 0.25 percent fumaric acid and about 1.75 percent acrylic acid, and is from about 40 to about 60 percent total solids in water.

4. A composition in accordance with claim 1, wherein said latex is a copolymer of vinylidene chloride and acrylonitrile, with dibutyl phthalate, in water.

5. A composition in accordance with claim 4, wherein said latex comprises about 75 percent of a copolymer of about 85 percent vinylidene chloride and about 15 percent acrylonitrile, with about 20 percent of dibutyl phthalate, and is about 40 to about 60 percent total solids, in water.

6. A composition in accordance with claim 1, wherein said latex is a copolymer of ethyl acrylate and methyl methacrylate, in water.

7. A composition in accordance with claim 6, wherein said latex comprises about 67 percent ethyl acrylate and about 33 percent methyl methacrylate, with about 1 percent methacrylic acid and about 0.5 acrylic acid, and is from about 40 to about 60 percent total solids, in water.

8. A composition in accordance with claim 1, wherein said latex is internally plasticized polyvinyl acetate copolymer having a Brookfield viscosity of from about 750 to about 850 centipoises, and is from about 40 to about 65 percent total solids, in water.

9. A composition in accordance with claim 1, wherein said calcined petroleum coke comprises from about 95 to about 50 percent by weight of the electrically conductive coating and is from 90 to about 100 percent passable through a 100 mesh screen (Tyler equivalent).

10. A heating element comprising a base material having on at least one surface thereof a thin electrically conductive, heat producing film, said film comprising a mixture of from about 5 to about 50 percent of a heat-stable latex and from about 95 to about 50 percent by weight of a finely divided coke.

11. A heating element comprising a base material having on at least one surface thereof a thin electrically conductive, heat producing film, said film comprising a mixture of from about 5 to about 50 percent by weight of a heat-stable latex selected from the group consisting of a copolymer of styrene and butadiene, a copolymer of vinylidene chloride and acrylonitrile with dibutyl phthalate, a copolymer of ethyl acrylate and methyl methacrylate, and polyvinyl acetate, and from about 95 to about 50 percent by weight of a finely divided calcined petroleum coke, and water and a dispersant.

12. A heating element in accordance with claim 11, wherein said latex is a copolymer of styrene and butadiene, with furmaric acid and acrylic acid, in water.

13. A heating element in accordance with claim 12, wherein said latex comprises about 57 percent styrene and about 41 percent butadiene, with about 0.25 percent fumaric acid and about 1.75 percent acrylic acid, and is from about 40 to about 60 percent total solids, in water.

14. A heating element in accordance with claim 11, wherein said latex is a copolymer of vinylidene chloride and acrylonitrile, with dibutyl phthalate, in water.

15. A heating element in accordance with claim 14, wherein said latex comprises about 75 percent of a copolymer of about 85 percent vinylidene chloride and about 15 percent acrylonitrile, with about 20 percent of dibutyl phthalate, and is about 40 to about 60 percent total solids, in water.

16. A heating element in accordance with claim 11, wherein said latex is a copolymer of ethyl acrylate and methyl methacrylate, in water.

17. A heating element in accordance with claim 16, wherein said latex comprises about 67 percent ethyl acrylate and about 33 percent methyl methacrylate, with about 1 percent methacrylic acid and about 0.5 acrylic acid, and is from about 40 to about 60 percent total solids, in water.

18. A heating element in accordance with claim 11, wherein said latex is internally plasticized polyvinyl acetate copolymer having a Brookfield viscosity of from about 750 to about 850 centipoises, and is from about 40 to about 65 percent total solids, in water.

19. A heating element in accordance with claim 11 wherein said calcined petroleum coke comprises from about 95 to about 50 percent by weight of the electrically conductive coating and is from 90 to about 100 percent passable through a 100 mesh screen (Tyler equivalent).

References Cited

UNITED STATES PATENTS

| 2,835,605 | 5/1958 | Nelson et al. | 252—502 |
| 3,220,345 | 11/1965 | Kline et al. | 117—226 |
| 2,730,597 | 1/1956 | Podolsky et al. | 252—511 |
| 3,035,955 | 5/1962 | Fucker et al. | 252—511 |

S. H. BLECH, Primary Examiner

W. J. BRIGGS, Assistant Examiner

U.S. Cl. X.R.

117—226; 252—511; 260—17, 29.7